United States Patent [19]
Kashani

[11] Patent Number: 5,254,247
[45] Date of Patent: Oct. 19, 1993

[54] MAGNETIC FLUID CONDITIONER HAVING MAGNETIC FIELD SHIELDING MEANS

[75] Inventor: Hooshang Kashani, San Juan Capistrano, Calif.

[73] Assignee: Cashew Consulting, Inc., Irvine, Calif.

[21] Appl. No.: 877,290

[22] Filed: May 1, 1992

Related U.S. Application Data

[63] Continuation-in-part of Ser. No. 600,917, Oct. 22, 1990, abandoned.

[51] Int. Cl.⁵ .............................................. C02F 1/48
[52] U.S. Cl. .................................. 210/222; 123/538; 96/1
[58] Field of Search ................ 210/222, 695; 24/458, 24/704.1; 55/100; 123/536, 538

[56] References Cited

U.S. PATENT DOCUMENTS

| | | | |
|---|---|---|---|
| 2,652,925 | 9/1953 | Vermeiren | 210/222 |
| 4,265,755 | 5/1981 | Zimmerman | 210/222 |
| 4,439,899 | 4/1984 | ReuBoiu et al. | 24/458 |
| 4,711,271 | 12/1987 | Weisenbarger et al. | 210/222 |
| 4,888,113 | 12/1989 | Holcomb | 210/222 |
| 4,946,590 | 8/1990 | Hertzog | 210/222 |
| 4,995,425 | 2/1991 | Weisenbarger et al. | 210/222 |
| 5,030,344 | 7/1991 | Ambrose | 210/222 |
| 5,122,277 | 6/1992 | Jones | 210/222 |

FOREIGN PATENT DOCUMENTS 433035  6/1991  European Pat. Off. ............ 210/222

*Primary Examiner*—Matthew O. Savage
*Attorney, Agent, or Firm*—Hawes & Fischer

[57] ABSTRACT

A compact magnetic fluid conditioner comprising a housing to be attached to a conduit through which a fluid (e.g. water or fuel) is conveyed. The housing of the fluid conditioner contains a plurality of rectangular bar magnets that are arranged end-to-end one another in a 1×3 array of magnets having alternating polarities relative to one another. A magnetic field shielding enclosure is removably attached to the conduit so as to completely surround the fluid conditioner and that portion of the conduit to which the housing of the conditioner is attached. Accordingly, the magnetic field generated by the magnets will be confined to and focused upon the conduit and the fluid passing therethrough.

7 Claims, 5 Drawing Sheets

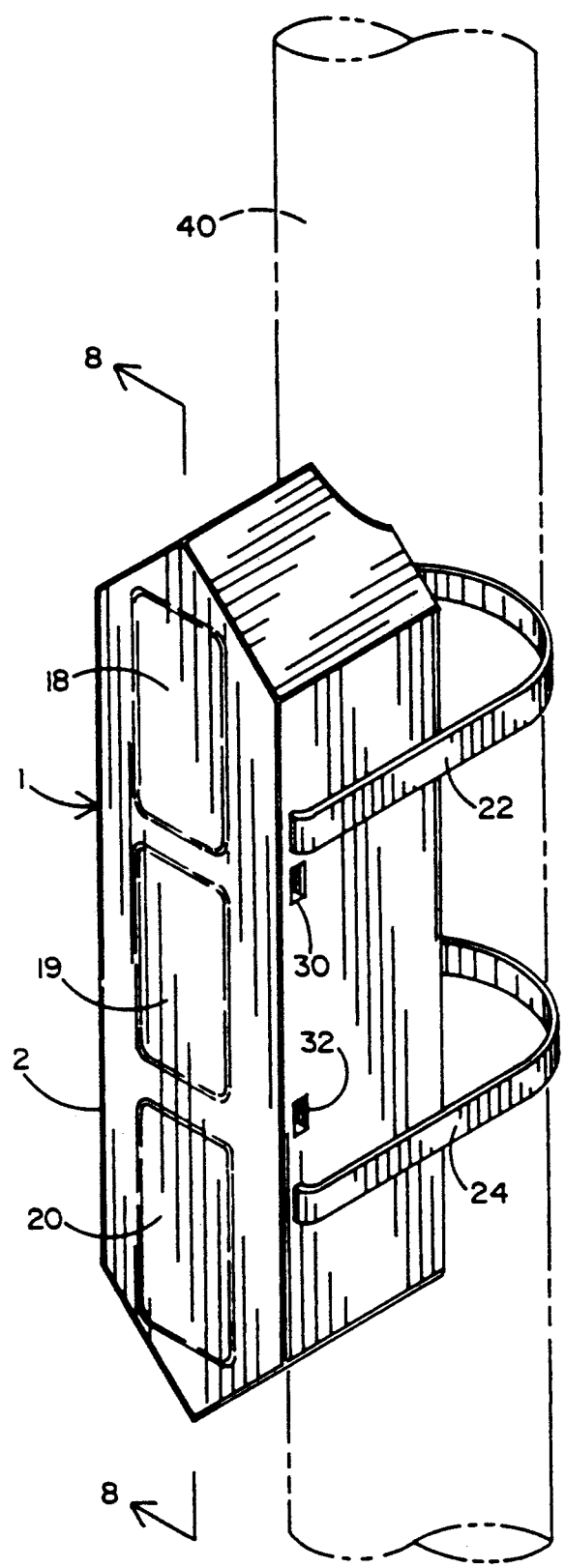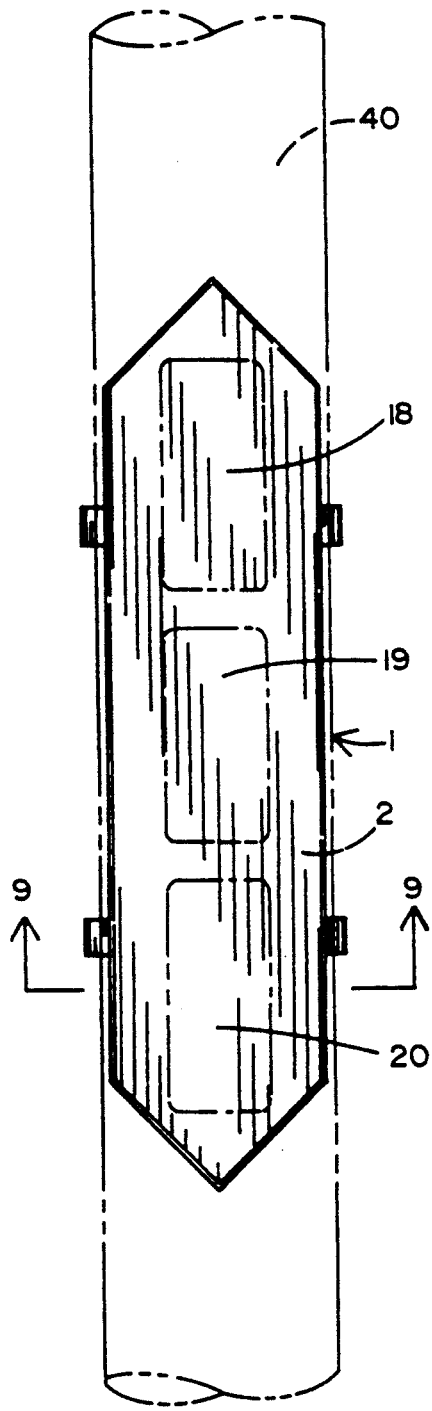
FIG. 6
FIG. 7

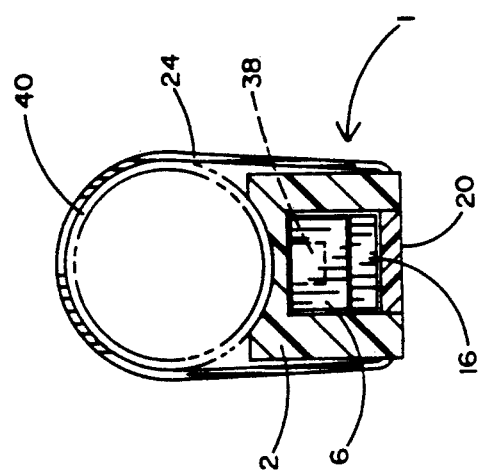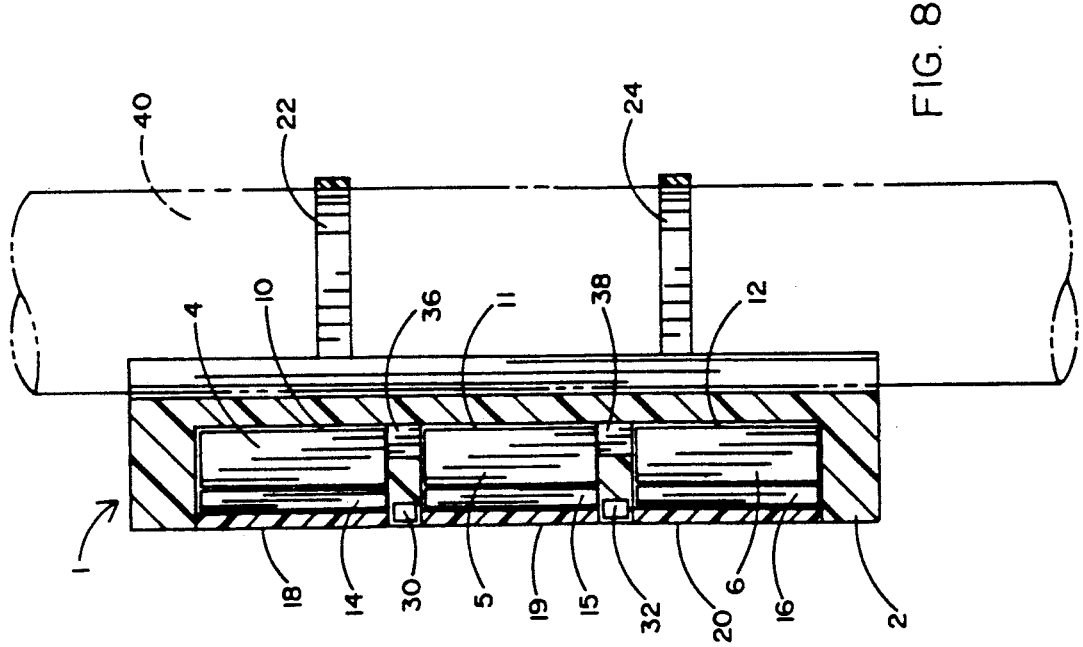

MAGNETIC FLUID CONDITIONER HAVING MAGNETIC FIELD SHIELDING MEANS

CROSS REFERENCES TO RELATED PATENT APPLICATIONS

This patent application is a continuation-in-part of application Ser. No. 600,917 filed oct. 22, 1990, now abandoned.

BACKGROUND OF THE INVENTION

1. Field of the Invention

This invention relates to a magnetic fluid conditioner which is to be attached to a fluid conduit and to a magnetic field shielding enclosure which surrounds both the fluid conditioner and the conduit so as to confine the magnetic field produced by the conditioner to the conduit and the fluid passing therethrough.

2. Prior Art

Magnetic fluid conditioners are known which are positioned in proximity to a conduit to treat a fluid being conveyed therethrough. Generally speaking, one or more magnets are used to generate a magnetic field which penetrate the conduit and treats the fluid. However, the magnetic field produced by the magnets is known to affect the operation of certain electrical and electro-mechanical devices that are disposed in the vicinity of the magnetic fluid conditioner and characterized as being adversely susceptible to the magnetic field produced thereby. Accordingly, while it is desirable to increase the strength of the magnetic field for penetrating a fluid conduit, it would also be desirable to be able to confine the field to that portion of the conduit with which the fluid conditioner is associated.

Examples of magnetic fluid conditioners that include a plurality of axially aligned magnets, the polarities of which alternate from one magnet to the next, for generating a magnetic field in proximity to a fluid conduit are available by referring to the following U.S. patents:

| | |
|---|---|
| 2,652,925 | September 22, 1953 |
| 4,755,288 | July 5, 1988 |

However, neither of these patents includes any magnetic field shielding means by which to confine the magnetic field to that portion of the conduit to which the fluid conditioner is associated.

Examples of magnetic fluid conditioners that include a housing in which a plurality of magnets are retained and which is removably attached to a fluid conduit to treat the fluid passing therethrough is available by referring to the following U.S. patents:

| | |
|---|---|
| 4,265,755 | May 5, 1981 |
| 4,711,271 | December 8, 1987 |
| 4,808,306 | February 28, 1989 |

However, the housing in which the plurality of magnets are retained is not adapted to shield a magnetic field and, consequently, is incapable of confining the magnetic field to that portion of the conduit to which said housing is attached.

SUMMARY OF THE INVENTION

In general terms, a magnetic fluid conditioner is disclosed to be attached to a fluid conduit to treat a fluid (e.g. water or fuel) passing through the conduit. The fluid conditioner includes a housing that is attached to the conduit by means of a pair of connecting straps which extend from one side of the housing and around the conduit for receipt by locking clasps located within slots at the opposite side of the housing. A plurality of (e.g. three) rectangular bar magnets having alternating polarities are arranged in spaced, end-to-end alignment with one another within respective cavities formed in the housing. Tunnels are formed between the cavities to permit the magnetic fields that are generated by the magnets therein to interact. Each magnet within its cavity is covered by a magnetic field shielding plate, and the cavities are sealed by a non-metallic plug or by a resinous potting material.

A magnetic field shielding enclosure is positioned so as to completely surround the magnetic fluid conditioner and that portion of the conduit to which the housing of the conditioner is attached. The shielding enclosure comprises a pair of complementary shielding sections that are fastened together so that, in the assembled configuration, the enclosure is detachably connected to the conduit by means of friction. Accordingly, the magnetic field shielding plates and the magnetic field shielding enclosure act to confine and focus the magnetic fields generated by the magnets within the housing for the purpose of penetrating the conduit and treating the fluid passing therethrough. By virtue of the foregoing, the operation of electrical and electromechanical instrumentation that are located in the vicinity of the magnetic fluid conditioner will not be adversely effected as a consequence of otherwise being subjected to the magnetic field produced by the conditioner.

BRIEF DESCRIPTION OF THE DRAWINGS

FIG. 6 is a perspective view of the magnetic fluid conditioner attached to one side of a fluid conduit;

FIG. 7 is a bottom view of the fluid conditioner of FIG. 6;

FIG. 8 is a cross-section taken along lines 8—8 of FIG. 6;

FIG. 9 is a cross-section taken along lines 9—9 of FIG. 7;

DESCRIPTION OF THE PREFERRED EMBODIMENT

Figure 2:
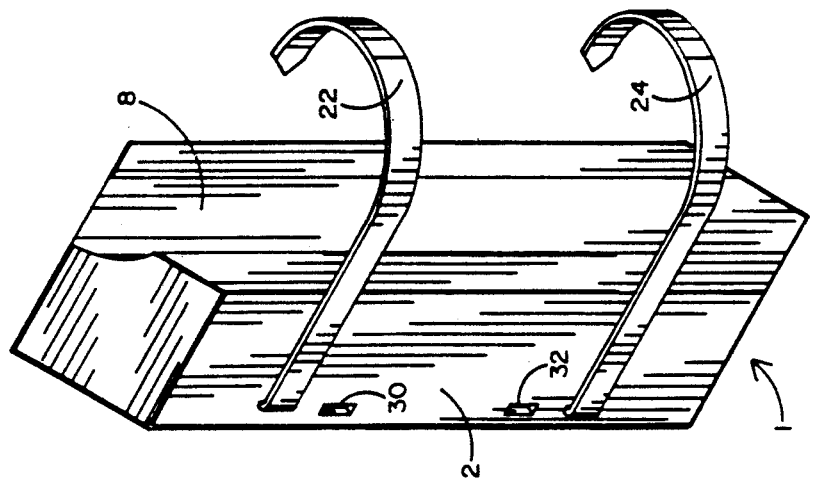
FIG. 2 is a perspective view of the housing of the magnetic fluid conditioner of FIG. 1.
Figure 1:
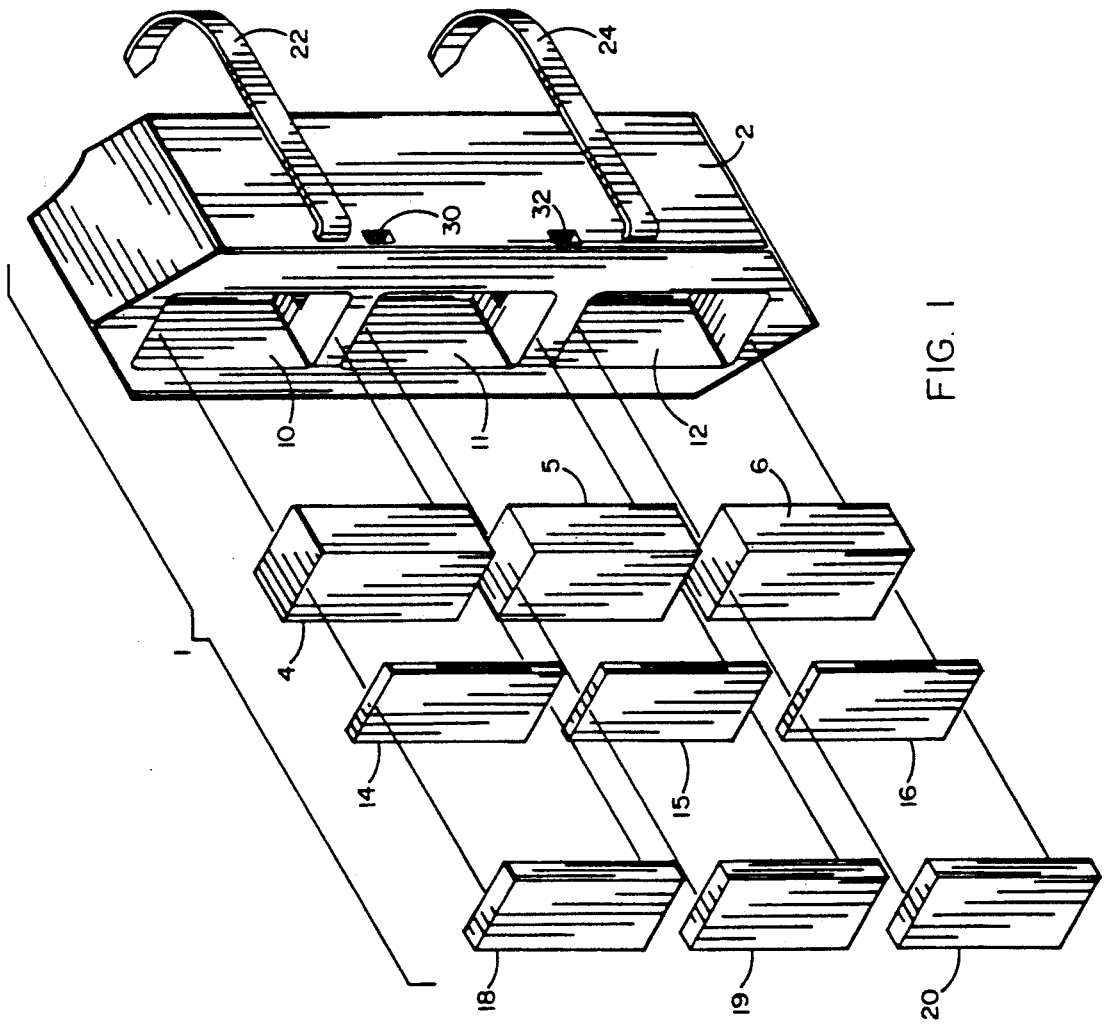
FIG. 1 is an exploded view of the magnetic fluid conditioner which forms the present invention.

The magnetic fluid conditioner 1 which forms a part of the present invention and which is adapted to treat a variety of fluids including, but not limited to, water and fuel, is initially described while referring to the drawings, where FIGS. 1 and 2 show the fluid conditioner comprising a non-magnetic housing 2 in which a plurality of (e.g. three) magnets 4, 5 and 6 are retained. By way of example, each of the magnets 4-6 is a rectangular bar magnet that is formed from a ceramic material, barium ferrite, or the like. The housing 2 of fluid conditioner 1 is manufactured from non-magnetic nylon, PVS, or the like, and has an arcuate receptacle 8 formed in the top face thereof. As will be explained when referring to FIGS. 8 and 9, a cylindrical pipe, fuel line, conduit 40, or similarly shaped flow path, may be conveniently received within the arcuate receptacle 8, whereby the housing 2 may be mounted flush against one side of the conduit.

Figure 3:
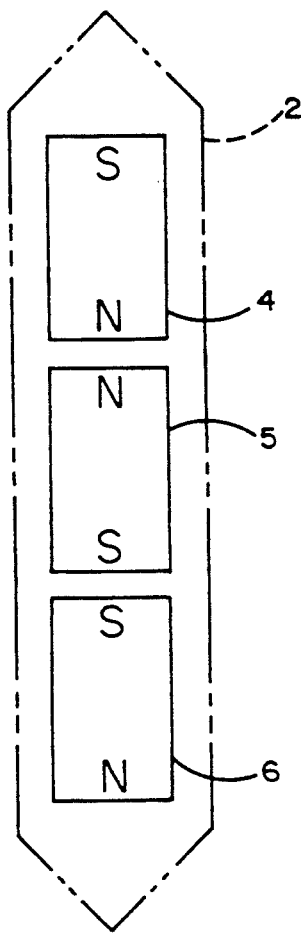
FIG. 3 illustrates the alignment of the magnets within the housing of FIG. 2.

The housing 2 of fluid conditioner 1 has a plurality of (e.g. three) hollow, rectangular cavities 10, 11 and 12 that are separated from one another by opposing, non-magnetic endwalls. The cavities 10-12 are aligned with one another along the longitudinal axis of the housing 2. The magnets 4-6 are loaded into respective cavities 10-12 so as to be aligned end-to-end and spaced from one another in a 1×3 array with the flat faces thereof facing towards the fluid conduit. As is best shown in FIG. 3 the polarities of the magnets 4-6 alternate relative to one another.

Referring once against to FIGS. 1 and 2, after the magnets 4-6 are loaded into cavities 10-12 of housing 2, the rear face of each magnet is covered by a respective magnetic field shield 14, 15 and 16. The magnetic field shields 14-16 are rectangular plates that are fabricated from a suitable magnetic material and conform to the shape of the magnets 4-6 which they overlie. The purpose of magnetic field shields 14-16 is to prevent the magnetic field generated by magnets 4-6 from penetrating the bottom of housing 2, whereby the lines of magnetic flux will be focused on the fluid conduit 40 which lies in contact with the arcuate receptacle 8 at the top of housing 2.

After the magnetic field shields 14-16 are positioned atop magnets 4-6 within respective cavities 10-12 of housing 2, the cavities are closed by means of plugs 18, 19 and 20. Plugs 18-20 may be manufactured from the same non-metallic material that is used to form housing 2. The plugs 18-12 are covered by a suitable adhesive material so that the bottom of the housing 2 will have a smooth, flat surface. In the alternative, plugs 18-20 may be eliminated and the cavities 10-12 otherwise filled with a potting material (e.g. epoxy resin, or the like) to cover magnetic shields 14-16 until a smooth, flat surface is formed along the bottom of housing 2.

Figure 4:
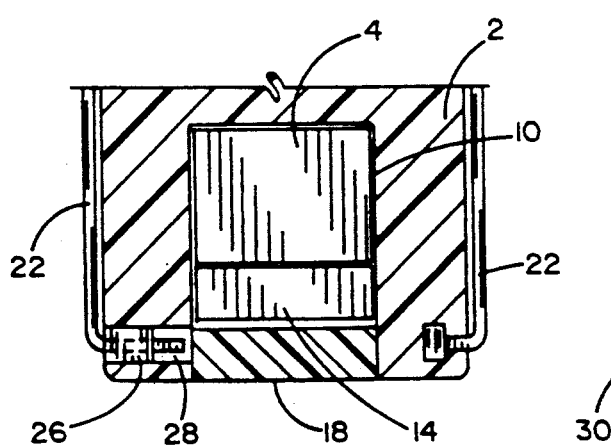
FIG. 4 is a cross-section taken along lines 4—4 of FIG. 6.

The housing 2 of fluid conditioner 1 has a pair of thin connecting straps 22 and 24 associated therewith. The straps 22 and 24 are spaced axially from one another along housing 2 and have respective fixed and free ends. That is, first ends of straps 22 and 24 are fixedly connected (i.e. embedded) within one side of the housing 2. As is best shown in FIG. 4 the free ends of straps 22 and 24 are adapted to be inserted through and retained by locking clasps 26 located in slots 28 (only one of which being shown) at opposite sides of housing 2. The straps 22 and 24 are of suitable length so as to surround the fluid conduit and thereby enable magnetic fluid conditioner 1 to be attached to said conduit.

Figure 5:
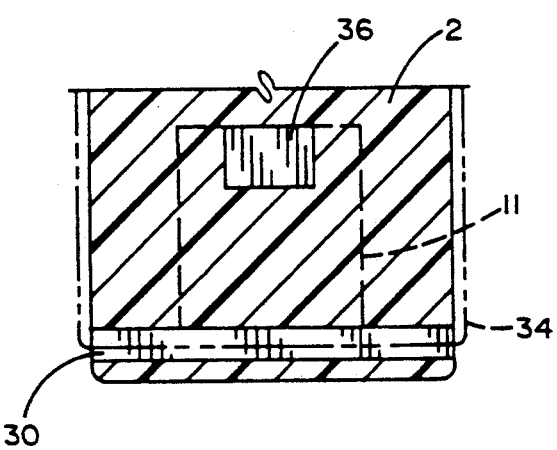
FIG. 5 is a cross-section taken along lines 5—5 of FIG. 6.

However, it may be desirable to remove the magnetic fluid conditioner 1 from the conduit for displacement therealong or relocation to another conduit. In this case, and in the event that the free ends of connecting straps 22 and 24 are not removable from the locking clasps 26 in slots 28, it may be necessary to cut the straps. Therefore, to enable fluid conditioner 1 to be reattached to a conduit, a pair of continuous, laterally extending channels 30 and 32 are formed through housing 2. As is best shown in FIG. 5, a tie (e.g. a string, strap or the like) may be pushed through the channels (e.g. 30) in housing 2 (shown diagrammatically as reference numeral 34) and tied around the fluid conduit, whereby to reattach the fluid conditioner 1 to said conduit in much the same manner that connecting straps 22 and 24 attach conduit 1 to the conduit by inserting said straps into slots 28.

Referring concurrently to FIGS. 6-9 of the drawings, the magnetic fluid conditioner 1 is shown attached to a conduit 40 through which a fluid (e.g. water or fuel) is conveyed. More particularly, the housing 2 of conditioner 1 is positioned such that one side of the conduit 40 is received within the arcuate receptacle 8 formed in the top face of said housing. The free ends of connecting straps 22 and 24 are positioned around conduit 40 and then inserted through the slots (28 of FIG. 4) of housing 2 for receipt by the locking clasps (26 of FIG. 4), whereby said free ends are no secured to housing 2 with the fluid conditioner 1 being mounted upon and retained flush against conduit 40. In this manner, the longitudinal axes of the magnet 4-6 will be coincidentally aligned with one another and aligned parallel with the longitudinal axis of conduit 40.

As is best shown in FIG. 8, a pair of tunnels 36 and 38 are formed in housing 2 through the end walls that separate the adjacent cavities 10-12 in which respective magnets 4-6 are housed. More particularly, tunnel 36 extends through the end wall between cavities 10 and 11 and tunnel 38 extends through the end wall between cavities 11 and 12 The tunnels 36 and 38 provide passages through which the magnetic field generated by magnets 4-6 in cavities 10-12 can interact with one another.

Figure 10:
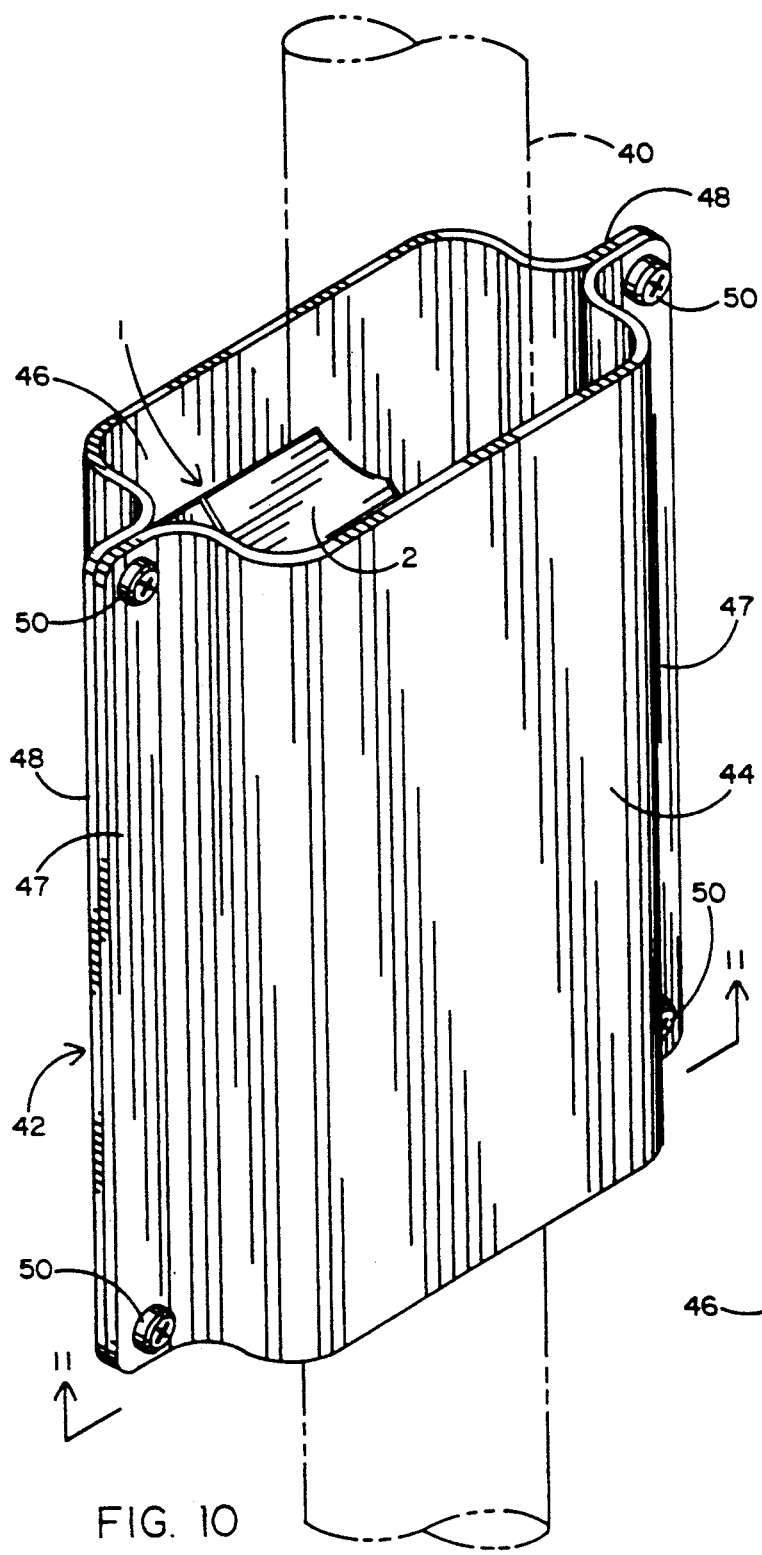
FIG. 10 is a perspective view showing the magnetic field shielding enclosure of the present invention surrounding the magnetic fluid conditioner of FIG. 6.
Figure 11:
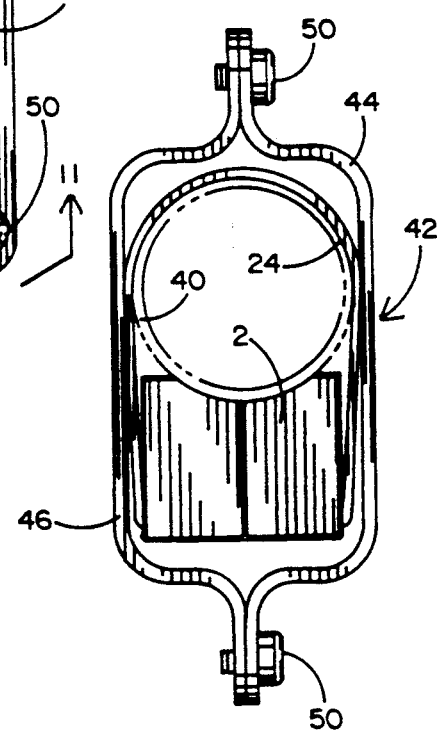
FIG. 11 is a cross-section taken along lines 11—11 of FIG. 10.

FIGS. 10 and 11 of the drawings show a hollow magnetic field shielding enclosure 42 which surrounds the magnetic fluid conditioner 1 after said conditioner has been secured (i.e. strapped) to the fluid conduit 40. The magnetic field shielding enclosure 42 is formed from a suitable magnetic material and includes a configuration comprising complementary upper and lower shielding sections (i.e. halves) 44 and 46. Enclosure 42 is of sufficient width to receive at the interior thereof the housing 2 of fluid conditioner 1 and the fluid conduit 40 to which conditioner 1 is attached. Each shielding section 44 and 46 has a respective pair of oppositely disposed ribs or flanges 47 and 48 extending therealong which, in the assembled relationship, are mated face-to-face one another. A number of suitable fasteners 50 extend through the opposing flanges 47 and 48 to connect shielding sections 44 and 46 together. It is desirable that the width of magnetic field shielding enclosure 42 be selected so that, in the assembled relationship of FIGS. 10 and 11, the enclosure 42 will be retained upon the conduit 40 by means of friction, whereby to prevent the inadvertent removal or displacement of said enclosure relative to fluid conditioner 1.

In operation, the magnetic field shielding enclosure 42 will reinforce the shielding plates 14-16 (of FIG. 1) within housing 2 to prevent leakage of the magnetic field produced by magnets 4-6 (also of FIG. 1) and confine said magnetic field to the conduit 40. That is to say, the enclosure 42 completely surrounds the magnets in the housing 2, whereby the lines of magnetic flux emitted from fluid conditioner 1 will be blocked by shielding sections 42 and 44 such that the magnetic field will be concentrated upon conduit 40. Accordingly, the power of the magnetic field will be increased for penetrating the conduit 40 and more efficiently treating the fluid passing therethrough. Moreover, the operation of electro-mechanical and electrical instrumentation located in the vicinity of magnetic fluid conditioner 1 will not be adversely effected as a consequence of being subjected to the magnetic field generated by said conditioner. The advantage of applying a magnetic field, such as that generated by the magnetic fluid conditioner 1 of the present invention, to a fluid for improving taste and reducing hardness (where the fluid is water) and for improving the efficiency of combustion (where the fluid is fuel) is well documented and will not be described in detail herein.

It will be apparent that while a preferred embodiment of the invention has been shown and described, various modifications and changes may be made without departing from the true spirit and scope of the invention. For example, although a single magnetic fluid condition 1 has been shown as being attached to one side of fluid conduit 40, it is within the scope of the present invention to mount a pair of such fluid conditioners at opposite sides of the conduit and surround each of said conditioners by the magnetic field shield 42 that has been described above.

Having thus set forth a preferred embodiment of the present invention, what is claimed is:

1. A combination including a conduit through which a fluid flows and a magnetic fluid conditioner adapted to be attached to said fluid conduit, said fluid conditioner comprising a non-magnetic housing to be attached to a portion of the fluid conduit, said housing having a longitudinal axis that is parallel to said conduit and a plurality of cavities extending along said axis, a plurality of magnets, one of said magnets being located within each of said cavities of said housing and aligned along said longitudinal axis to generate a magnetic field to penetrate said conduit, a plurality of magnetic field shielding plates, one of said shielding plates being located within each of said cavities of said housing to cover respective ones of said magnets in said cavities such that said plurality of magnets are positioned between the conduit and said plurality of magnetic field shielding plates, and magnetic field shielding enclosure means surrounding said housing and the portion of the conduit to which said housing is attached so that said enclosure means and said pluralities of shielding plates block and confine the magnetic field generated by said plurality of magnets to said conduit and the fluid flowing therethrough, said magnetic field shielding enclosure means comprising magnetic field shielding sections that are connected together at opposite sides of the fluid conduit.

2. The combination fluid conduit and magnetic fluid conditioner recited in claim 1, wherein said magnetic field shielding enclosure means is attached to the fluid conduit by means of friction.

3. The combination fluid conduit and magnetic fluid conditioner recited in claim 1, wherein said magnetic field shielding enclosure means includes a pair of opposing magnetic field sections that are connected together at opposite sides o the fluid conduit to form an enclosure to completely surround said housing and that portion of the conduit to which said housing is attached.

4. The combination fluid conduit and magnetic fluid conditioner recited in claim 1, wherein each magnet of said plurality of magnets located in said cavities is a bar magnet, said bar magnets having polarities which alternate from one magnet to the next along the longitudinal axis of said housing.

5. The combination fluid conduit and magnetic fluid conditioner recited in claim 1, wherein said housing includes an end wall located between each pair of axially aligned cavities in which respective ones of said magnet ar received said housing further including a tunnel formed through each end wall for permitting said cavities to communicate with one another.

6. The combination fluid conduit and magnetic fluid conditioner recited in claim 1, further comprising strap means having first and opposite ends and extending around the conduit to secure said housing thereto, the first end of said strap means being fixedly connected to said housing and the opposite end of said strap means being connected to a locking clasp by way of a slot formed in s id housing.

7. The combination fluid conduit and magnetic fluid conditioner recited in claim 1, further comprising at least one hollow channel extending completely through said housing and tie means extending through said channel and around the conduit in order to secure said housing to the conduit.

* * * * *